United States Patent
Schmitt et al.

(10) Patent No.: US 11,216,547 B2
(45) Date of Patent: Jan. 4, 2022

(54) HEADSET WITH FINGERPRINT AUTHENTICATION

(71) Applicant: Microsoft Technology Licensing, LLC, Redmond, WA (US)

(72) Inventors: Nicolas J-C Schmitt, Beijing (CN); Andrew David Peterson, Mukilteo, WA (US); Kin Yeung Lee, Shenzhen (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 16/612,891

(22) PCT Filed: May 15, 2017

(86) PCT No.: PCT/CN2017/084341
§ 371 (c)(1),
(2) Date: Nov. 12, 2019

(87) PCT Pub. No.: WO2018/209494
PCT Pub. Date: Nov. 22, 2018

(65) Prior Publication Data
US 2020/0159897 A1 May 21, 2020

(51) Int. Cl.
*H04R 25/00* (2006.01)
*G06F 21/32* (2013.01)
(Continued)

(52) U.S. Cl.
CPC .......... *G06F 21/32* (2013.01); *H04L 63/0861* (2013.01); *H04R 1/1008* (2013.01); *H04R 1/1033* (2013.01); *G06F 2213/0042* (2013.01)

(58) Field of Classification Search
CPC ............ G06F 21/32; G06F 2213/0042; G06F 3/0484; H04L 63/0861; H04R 1/1008; H04R 1/1033; G06K 9/00; H04M 1/67
(Continued)

(56) References Cited

U.S. PATENT DOCUMENTS 8,009,874 B2 8/2011 Brown
2008/0049980 A1 2/2008 Castaneda et al.
(Continued)

FOREIGN PATENT DOCUMENTS

CN 203279187 U 11/2013
CN 103838992 A * 6/2014
(Continued)

OTHER PUBLICATIONS

"International Search Report and Written Opinion Issued in PCT Application No. PCT/CN17/084341", dated Feb. 26, 2018, 9 pages.

*Primary Examiner* — Md S Elahee
(74) *Attorney, Agent, or Firm* — Alleman Hall Creasman & Tuttle LLP

(57) ABSTRACT

Implementations of the subject matter described herein provide a "dual-mode" headset that is equipped with a fingerprint authentication apparatus. The headset can be coupled to an electronic device, such as personal computers (PCs) and tablets, and functions as a typical audio accessory to receive sound. In addition, by means of the associated fingerprint authentication apparatus, the headset also facilitates the user to log in his/her own account on that device.

11 Claims, 2 Drawing Sheets

(51) Int. Cl.
*H04L 29/06* (2006.01)
*H04R 1/10* (2006.01)

(58) Field of Classification Search
USPC .......................................... 381/370; 455/411
See application file for complete search history.

(56) References Cited

U.S. PATENT DOCUMENTS

| | | | |
|---|---|---|---|
| 2010/0197273 A1* | 8/2010 | Uchida | .................. H04M 1/67 455/411 |
| 2010/0311390 A9 | 12/2010 | Black et al. | |
| 2012/0159617 A1 | 6/2012 | Wu et al. | |
| 2016/0086402 A1 | 3/2016 | Black et al. | |
| 2018/0129853 A1* | 5/2018 | Lee | .................. G06K 9/00013 |

FOREIGN PATENT DOCUMENTS

| | | | | | |
|---|---|---|---|---|---|
| CN | 103838992 A | 6/2014 | | | |
| CN | 104765994 A | 7/2015 | | | |
| EP | 2175580 A1 | 4/2010 | | | |
| EP | 3822831 A1 * | 5/2021 | ............ | G06F 21/32 | |
| WO | 2008112467 A1 | 9/2008 | | | |
| WO | 2017024837 A1 | 2/2017 | | | |

* cited by examiner

HEADSET WITH FINGERPRINT AUTHENTICATION

CROSS REFERENCE TO RELATED APPLICATIONS

The present application is a U.S. National Phase of International Patent Application Serial No. PCT/CN2017/084341 entitled "HEADSET WITH FINGERPRINT AUTHENTICATION", filed May 15, 2017, the entire contents of which is hereby incorporated by reference for all purposes.

BACKGROUND

With the fast development of fingerprint authentication or identification technologies, many electronic devices such as personal computers and tablets nowadays have been integrated with fingerprint authentication components, or can be equipped with external fingerprint authentication accessories. Such fingerprint authentication components/accessories (sometime also referred to as the fingerprint reader) facilitate users' login to their own computers or accounts directly by using the unique personal identity, instead of the long and complex (alphanumeric mixed with symbols) passwords.

SUMMARY

Currently there are a large number of electronic devices that do not have built-in function of fingerprint authentication. This means, there may still be a need to equip those devices with external fingerprint authentication apparatus to facilitate user's secure and convenient login. Headset nowadays, as an essential audio input/output (I/O) accessory for majority of electronic devices, provides a possible platform to accommodate the fingerprint authentication module or integrate the fingerprint authentication function. This enables a single user to listen to an audio source privately, and meanwhile login his/her account or device in a secured way.

Implementations of the subject matter described herein provide a "dual-mode" headset that is equipped with a fingerprint authentication apparatus. The headset can be coupled to an electronic device, such as personal computers (PCs) and tablets, and functions as a typical audio accessory to receive sound. In addition, by means of the associated fingerprint authentication apparatus, the headset also facilitates the user to log in his/her own account on that device.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

The above and other objectives, features and advantages of the subject matter described herein will become more apparent through more detailed depiction of example implementations of the subject matter described herein in conjunction with the accompanying drawings, wherein in the example implementations of the subject matter described herein, same reference numerals usually represent same components.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

In general, compared to the conventional headsets which do not support the fingerprint authentication, implementations of the subject matter, on the one hand, provide a dual-mode headset that supports ordinary audio input/output and fingerprint authentication. Furthermore, compared to the conventional fingerprint authentication solutions which do not support the wake-up of the electronic device by using the fingerprint, implementations of the subject matter, on the other hand, enable the user to wake up their device and log in their account or application by simply touching the fingerprint reader associated with the headset. In other words, such headset equipped with a fingerprint reader no longer requires a press on the keyboard or the use of the mouse first to wake up the device and then performing the login process. Now some example implementations will be described merely for illustration.

Figure 1:
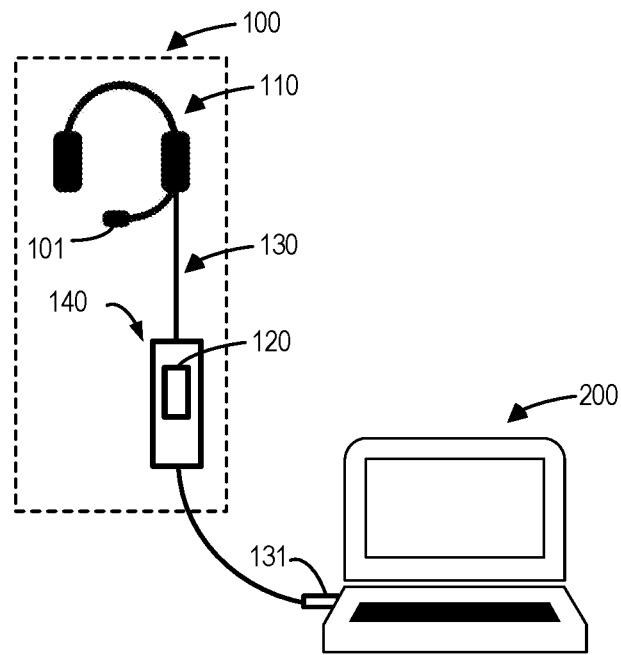
FIG. 1 illustrates a schematic configuration of system consisting of an electronic device and a headset with a fingerprint reader according to an implementation of the subject matter described herein.

FIG. 1 illustrates a schematic configuration of system consisting of an electronic device 200 and a headset 100 coupled to the electronic device 200 according to an implementation of the subject matter described herein. In this example, the electronic device 200 is illustrated as a laptop. However, it is to be understood that this is merely for illustration without suggesting any limitations as to the scope of the subject matter described herein. Other types of electronic devices can also be envisaged, such as desktop computer, tablet, mobile phone, or any other types of fixed or portable devices.

As illustrated in FIG. 1, the headset 100 includes a head phone 110 and a fingerprint reader 120 coupled to the head phone 110. The head phone 110 may be in the form of either a single-earpiece (mono) or a double-earpiece (mono to both ears or stereo). Moreover, the head phone 110 may also be over-ear head phone or in-ear head phone. In this example, the headphone 110 is illustrated as an over-ear head phone with a double-earpiece.

Additionally, in some implementations, the headset 100 may enable hands-free functionality. For example, as illustrated in FIG. 1, the headset 100 may be additionally equipped with a microphone 101, which would be very useful especially for the users who work in call centers or some other telephone-intensive jobs, or for anybody wishing to have both hands free during a telephone conversation.

Alternatively, or in addition, in some implementations, the headset 100 may have a cable (or cord) 130 for coupling the head phone 110 to the electronic device 200. In some implementations, the cable 130 may have a connector 131 conforming to universal serial bus (USB) protocol. It is to be understood that this is merely for illustration without suggesting any limitations as to the scope of the subject matter described herein, and any other types of connector complying with other protocols can also be envisaged according to specific requirement.

Moreover, the cable 130 is not limited to the hard-wired connections as illustrated in FIG. 1. Rather, wireless connections such as Bluetooth, Wi-Fi, or optical communication are also possible. In some implementations, it is of course possible to have a cordless headset 100, and in this case, the fingerprint reader 120 could be an integrated or embedded component in the head phone 110.

As further illustrated in FIG. 1, the headset 100 may further have a volume controller 140 (sometimes also referred to as mid-cord volume control "puck") mounted on the cord 130, and in this case, the fingerprint reader 120 can be arranged at volume control puck. This is beneficial, because such volume controller 140 may provide sufficient area/room to accommodate or deploy the fingerprint reader 120. In this way, the fingerprint reader 120 does not need to occupy the limited space on the head phone 110, especially for the ear-in head phone.

In some implementations where there is a connector 131 (such as USB connector as mentioned above) between the headset 100 and the electronic device 200, once the headset 100 is coupled to the electronic device 200 which functions as its host machine, the fingerprint reader 120 may be automatically coupled to the electronic device 200 as well via the same cable 130. Accordingly, in some implementations, the driver for the fingerprint reader 120 can be pulled down through the internet along with the driver for the head phone 110, when the headset 100 is connected to the electronic device 200. The specifically designed driver for the fingerprint reader 120 will be discussed later.

It is to be understood that the described arrangements of the fingerprint reader 120 with respect to the headset 100 are only some examples, without suggesting any limitations as to the scope of the subject matter described herein. Any other suitable arraignments are possible as well.

Furthermore, conventional fingerprint authentication accessories do not support a wake-up function of the electronic device from a sleep mode. If a user wants to login his/her computer that is currently in a sleep mode, the user normally must first move/click the mouse or press the keyboard to wake up the computer, and then touch the fingerprint reader to perform the login action. This might be inconvenient since it makes the login action complex.

The fingerprint reader 120 of the headset 100 in accordance with implementations of the subject matter described herein further provides a fingerprint authentication function, which enables the user to use his/her fingerprint to directly wake up the computer from the sleep mode and log in the corresponding account or application, simply by one touch operation on the fingerprint reader. Such one-step "wake-up plus login" operation is realized by the specific controller associated with the fingerprint reader along with the specific driver module at the computer end. In this way, the wake-up of device and user authorization can be done in one shot, thereby reducing the user's interaction burden and improving the user experience.

Figure 2:
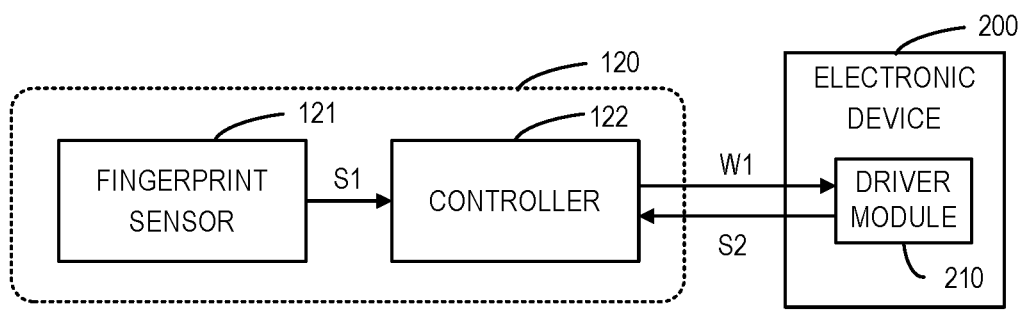
FIG. 2 illustrates a schematic configuration of fingerprint authentication system consisting of a fingerprint reader and an electronic device according to an implementation of the subject matter described herein.

FIG. 2 shows a schematic configuration of a fingerprint authentication system according to an implementation of the subject matter described herein. As shown, a fingerprint reader 120 can be connected to an electronic device 200 which functions as a host machine of the fingerprint reader 120.

In accordance with implementations of the subject matter described herein, the fingerprint reader 120 includes a fingerprint sensor 121 and controller 122 coupled to one another. The fingerprint sensor 121 can be implemented by a touch-sensitive surface with a spatial resolution that is high enough to detect fingerprint features formed by individual fingerprint ridges. In some implementations, a fingerprint sensor 121 can be used without a separate touch-sensitive surface. In these implementations, the fingerprint sensor 121 can serve as a substitute for many of the functions of the touch-sensitive surface with a much smaller form factor, as the fingerprint sensor 121 can detect movement of a contact over the fingerprint sensor, even when the fingerprint has an area that is as large as or larger than the area of the fingerprint sensor.

Alternatively, in other implementations, the fingerprint sensor 121 may be used in addition to a separate touch-sensitive surface (not shown). In this case, the fingerprint sensor 121 can augment the touch-sensitive surface by providing accurate detection of twisting motions of a contact, identifying different fingerprints of fingers that are used to perform gestures on the fingerprint sensor, and identifying a current user of the host electronic device 200. Furthermore, in implementations where the touch-sensitive surface is used as the fingerprint sensor 121, the term "fingerprint sensor" may refer to the touch-sensitive surface, or a region of the touch-sensitive surface, that is currently in high-resolution mode.

Upon detection of a user's fingerprint, the fingerprint sensor 121 may generate and provide one or more signals to the controller 122 for processing. For example, the controller may authorize the user based on a comparison between the obtained fingerprint and one or more pre-stored fingerprints, which will be discussed later. Specifically, in accordance with implementations of the subject matter described herein, in the case that the electronic device 200 is in a sleep mode, the controller 122, together with a driver module 210 included in the electronic device 200, is configured to cause the electronic device 200 to be "woken up", i.e., switch from the current sleep mode to a wake-up mode.

As used herein, the phrase "sleep mode" refers to a mode in which an electronic device "pauses" its current state and consumes low power. For example, the power supply to the device can be reduced below a threshold level, the display screen can be turned off, and the like. The phrase "wake-up mode" refers a mode in which the electronic device is fully on and consumes normal power which is larger than that of the "sleep mode".

In some implementations, the controller 122 is configured to wake up the electronic device 200 in response to detecting a user's touch on the fingerprint sensor 121, without authorizing the user. For example, referring to FIG. 1, upon detection of the touch by the user on fingerprint sensor 121, the fingerprint sensor 121 is operable to send a signal 51 to the controller 122, which in turn sends a wake-up command W1 to the driver module 210 included in the electronic device 20. In response, the driver module 210 may switch the electronic device 200 from the current sleep mode to a wake-up mode. For example, the normal powering can be resumed and the screen display can be switched on.

Then, in some implantations, the driver module 210 may indicate to the controller 122 that the electronic device 200 has been successfully woken up. For example, once the electronic device 200 is woken up, the driver module 210 of the electronic device 200 will send an indication S2 back to the controller 122 to indicate/confirm that the electronic device 200 has been woken up.

In response, the controller 122 may further authorize the user's identity. More specifically, the fingerprint sensor 121, upon detecting the user's touch, may obtain a fingerprint of the user. The fingerprint sensor 121 can detect the touch from the user and capture the user's one or more fingerprints using any of a plurality of touch sensing technologies now known or later developed, including but not limited to capacitive, resistive, infrared, and surface acoustic wave technologies, as well as other proximity sensor arrays or other elements for determining one or more points of contact with surface.

One or more fingerprints of a valid user(s) of the electronic device 200 may be obtained and stored in advance. The one or more fingerprints may be stored at the electronic device 200 and/or the fingerprint reader 120. The controller 122 may compare fingerprint obtained by the fingerprint sensor 121 with the one or more pre-stored fingerprints. If the obtained fingerprint is matched with one of the pre-stored fingerprints, then the user can be authorized. In alternative implementations, the controller 122 may send the obtained fingerprint to the driver module 210 for comparison, for example.

Any fingerprint matching technologies can be used. For example, in some implementations, the fingerprint sensor 121 can capture the user's fingerprint as an image. Then the fingerprint matching can be done based on image processing and comparison. Alternatively, or in addition, the fingerprint images can be converted into a series of analyzed data/parameters. In this case, the comparison may be done based on the extracted data/parameters rather than the actual images. Any other known or later developed fingerprint matching technologies can be used in connection with implementations of the subject matter described herein.

In the example implementations described above, the electronic device 200 is first woken up, and then the user's identity is authorized. In other words, the electronic device 200 will always be woken up from the sleep mode, regardless whether the fingerprint (or user) is one of the registered fingerprints (or users) with the electronic device 200 or not.

Alternatively, in other implementations, the user is first authorized and the electronic device 200 is woken up only if the user authorization succeeds. In such implementations, upon detecting the user's touch, the fingerprint sensor 121 obtains and provides the user's fingerprint to the controller 122 for comparison with one or more pre-stored fingerprints. If the obtained fingerprint matches one of the pre-stored fingerprints, the controller 122 may provide a wake-up command W1 to driver module 210, such that the driver module 210 switches the electronic device 200 from the sleep mode to the wake-up mode.

It will be appreciated that by means of the headset 100 described as above, the user may wake up their electronic devices and login the corresponding account or application on the electronic devices by simply touching the fingerprint reader 120 associated with the headset 100. Compared to the conventional techniques where the user needs to press a keyboard or move the mouse to wake up the electronic device, the headset 100 having the fingerprint reader 120 in accordance with implementations of the subject matter described herein enables a safe and more convenient login process. Moreover, the headset 100 described as above will be especially benefit for those users who work in a telephone-intensive environment and need to manipulate their computers at the same time, such as a job in a call center.

Figure 3:
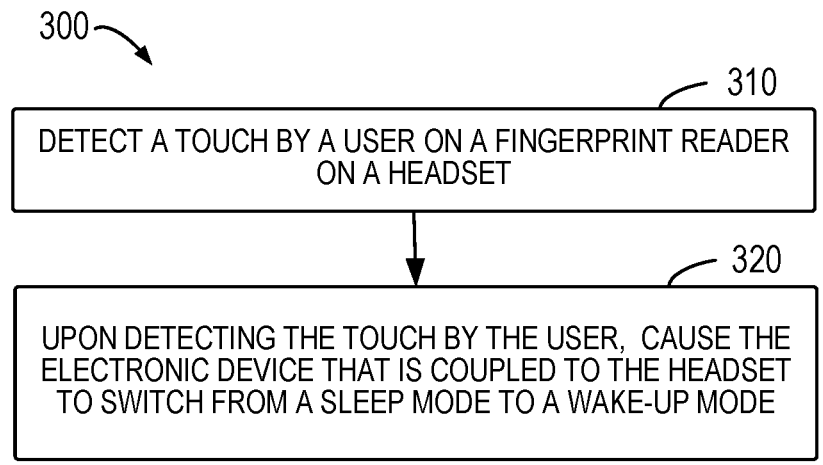
FIG. 3 illustrates a flowchart of a method implemented at the headset in accordance with one implementation of the subject matter described herein.

FIG. 3 illustrates a flowchart of a computer-implemented method 300 implemented at the headset 100 in accordance with one implementation of the subject matter described herein. At 310, a touch by a user on the fingerprint reader 120 of the headset 100 is detected. At 320, in response to detecting the touch by the user, the electronic device 200 that is coupled to the headset 100 is caused to switch from a sleep mode to a wake-up mode. Detailed actions at blocks 410 and 420 and possible other optional actions have been described above and will not be repeated herein.

Figure 4:
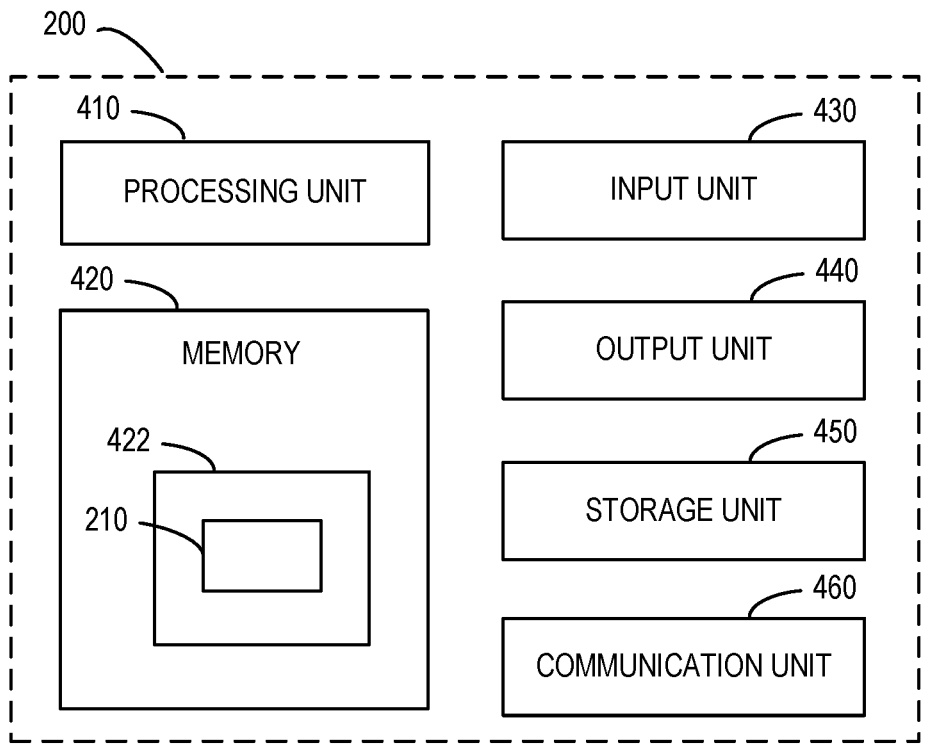
FIG. 4 illustrates a block diagram of an example implementation of the electronic device in which one or more implementations of the subject matter described herein may be implemented.

Hereinafter, an example implementation of the electronic device 200 is shown in FIG. 4. In this example, the electronic device 200 is in a form of a general-purpose computing device. Components of the electronic device 200 may include, but are not limited to, one or more processors or processing units 410, a memory 420, one or more input devices 430, one or more output devices 440, storage 450, and one or more communication units 460. The processing unit 410 may be a real or a virtual processor and is capable of performing various processes in accordance with a program stored in the memory 420. In a multi-processing system, multiple processing units execute computer-executable instructions to increase processing power.

The electronic device 200 typically includes a variety of machine readable medium. Such medium may be any available medium that is accessible by the computing system/server, including volatile and non-volatile medium, removable and non-removable medium. The memory 420 may be volatile memory (e.g., registers, cache, a random-access memory (RAM)), non-volatile memory (e.g., a read only memory (ROM), an electrically erasable programmable read only memory (EEPROM), a flash memory), or some combination thereof. The storage 450 may be removable or non-removable, and may include machine readable medium such as flash drives, magnetic disks or any other medium which can be used to store information and which can be accessed within the electronic device 200.

The electronic device 200 may further include other removable/non-removable, volatile/non-volatile computing system storage medium. Although not shown in FIG. 4, a disk driver for reading from or writing to a removable, non-volatile disk (e.g., a "floppy disk"), and an optical disk driver for reading from or writing to a removable, non-volatile optical disk can be provided. The memory 120 may include at least one program product having a set (e.g., at least one) of program modules that are configured to carry out the functions of various implementations of the subject matter described herein. The memory 420 may include at least one program product having a set (e.g., at least one) of program modules that are configured to carry out the functions of various implementations of the subject matter described herein.

As illustrated in FIG. 4, a program/utility tool 422 includes the driver module 210 for the fingerprint reader 120 of implementations of the subject matter described herein. In this example, the driver module 210 is implemented as a program module. However, this is merely for purpose of illustration, without suggesting any limitations as to the scope of the subject matter described herein. It is to be understood that the driver module 210 can be implemented by hardware and/or firmware in other implementations.

The input unit(s) 430 may be one or more of various different input devices. For example, the input unit(s) 430 may include a user device such as a mouse, keyboard, trackball, a pointing stick, etc. The input unit(s) 430 may implement one or more natural user interface techniques, such as speech recognition or touch and stylus recognition. As other examples, the input unit(s) 430 may include a scanning device, a network adapter, or another device that provides input to the electronic device 200. The output unit(s) 440 may be a display, printer, speaker, network adapter, or another device that provides output from the electronic device 200. The input unit(s) 430 and output unit(s) 440 may be incorporated in a single system or device, such as a touch screen or a virtual reality system.

The communication unit(s) 460 enables communication over communication medium to another computing entity. Additionally, functionality of the components of the electronic device 200 may be implemented in a single computing machine or in multiple computing machines that are able to communicate over communication connections. Thus, the electronic device 200 may operate in a networked environment using logical connections to one or more other servers, network personal computers (PCs), or another common network node. By way of example, and not limitation, communication media include wired or wireless networking techniques.

The electronic device 200 may also communicate, as required, with one or more external devices (not shown) such as a storage device, a display device, and the like, one or more devices that enable a user to interact with the electronic device 20, and/or any device (e.g., network card, a modem, etc.) that enables the electronic device 200 to communicate with one or more other computing devices. Such communication may be performed via an input/output (I/O) interface(s) (not shown).

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Hereinafter, some example implementations of the subject matter described herein will be listed.

In some implementations, a headset is provided. The headset comprises: a head phone; a fingerprint reader coupled to the head phone and operable to: detecting a touch by a user; and in response to detecting the touch, cause an electronic device to switch from a sleep mode to a wake-up mode, the headset being coupled to the electronic device.

In some implementations, the headset further comprises: a cable for coupling the head phone to the electronic device; and a volume controller mounted on the cable and accommodating the fingerprint reader.

In some implementations, the cable includes a connector conforming to a universal serial bus (USB) protocol.

In some implementations, the fingerprint reader comprises: a fingerprint sensor configured to, in response to detecting the touch by the user, provide a signal to a controller; and the controller coupled to the fingerprint sensor and configured to, in response to receiving the first signal, cause the electronic device to switch from the sleep mode to the wake-up mode.

In some implementations, the controller is configured to: in response to receiving the signal, obtain the fingerprint of the user captured by the fingerprint sensor; compare the fingerprint with at least one pre-stored pre-stored fingerprint; and in response to determining that the fingerprint matches the at least on pre-stored fingerprint, provide a wake-up command to the electronic device.

In some implementations, the controller is further configured to: in response to receiving an indication that the electronic device is woken up, facilitate login of an account corresponding to the user on the electronic device.

In some implementations, the controller is configured to: in response to receiving an indication that the electronic device is woken up, obtain the fingerprint from the fingerprint sensor; compare the fingerprint with at least one pre-stored fingerprint; and in response to determining that the first fingerprint matches the at least one pre-stored fingerprint, facilitate login of an account corresponding to the user on the electronic device.

In some implementations, an electronic device is provided. The electronic device comprises: a processing unit; and a driver module, when executed by the processing unit, configured to receive a wake-up command from the headset according to the present disclosure; and in response to receiving the wake-up command, switch the electronic device from a sleep mode to a wake-up mode.

In some implementations, the driver module is further configured to, in response to the electronic device being woken up, send an indication that the electronic device is woken up to the headset.

In some implementations, the driver module is further configured to: in response to determining that a fingerprint of the user captured by the fingerprint reader matches at least one pre-stored fingerprint, log in an account corresponding to the user on the electronic device.

In some implementations, a method implemented at a headset is provided. The method comprises: detecting a touch by a user on a fingerprint reader of the headset; and in response to detecting the touch by the user, causing an electronic device to switch from a sleep mode to a wake-up mode, the headset being coupled to the electronic device.

In some implementations, causing an electronic device to switch from a sleep mode to a wake-up mode comprises: in response to detecting the touch, obtaining a first fingerprint of the user; comparing the first fingerprint with at least one pre-stored second fingerprint; and in response to determining that the first fingerprint matches the pre-stored fingerprint, providing a wake-up command to the electronic device.

In some implementations, the method further comprises: in response to receiving an indication that the electronic device is woken up, facilitating login of an account corresponding to the user on the electronic device.

In some implementations, the method further comprises: in response to receiving an indication that the electronic device is woken up, obtaining the first fingerprint from the fingerprint sensor; comparing the first fingerprint with at least one pre-stored fingerprint; and in response to determining that the first fingerprint matches the at least one pre-stored fingerprint, facilitating login of an account corresponding to the user on the electronic device.

We claim:

1. A headset, comprising:
   a head phone;
   a fingerprint reader coupled to the head phone and including a fingerprint sensor and a controller,
      the fingerprint sensor configured to capture a fingerprint of a user; and
      the controller configured to obtain the fingerprint of the user captured by the fingerprint sensor, compare the fingerprint with at least one pre-stored fingerprint, and in response to determining that the fingerprint matches the at least one pre-stored fingerprint, provide a wake-up command to an external electronic device that is communicatively coupled to the headset, the wake-up command causing the electronic device to switch from a sleep mode to a wake-up mode.

2. The headset of claim 1, further comprising:
   a cable for communicatively coupling the head phone to the external electronic device; and
   a volume controller mounted on the cable and accommodating the fingerprint reader.

3. The headset of claim 2, wherein the cable includes a connector conforming to a universal serial bus (USB) protocol.

4. The headset of claim 1, wherein the controller is further configured to:
   in response to receiving an indication that the external electronic device is in the wake-up mode, facilitate login of an account corresponding to the user on the external electronic device.

5. The headset of claim 1, wherein the headset is wirelessly coupled to the external electronic device via a wireless communication protocol.

6. A method implemented at a headset comprising a head phone and a fingerprint reader coupled to the head phone, the method comprising:
   capturing a fingerprint of a user with a fingerprint sensor of the fingerprint reader;
   comparing, via the fingerprint reader, the fingerprint captured by the fingerprint sensor with at least one pre-stored fingerprint stored in memory of the fingerprint reader; and
   in response to determining that the fingerprint matches the at least one pre-stored fingerprint, provide a wake-up command to an external electronic device, the wake-up command causing the external electronic device to switch from a sleep mode to a wake-up mode.

7. The method of claim 6, further comprising:
   in response to receiving an indication that the external electronic device is in the wake-up mode, facilitating login of an account corresponding to the user on the external electronic device.

8. A headset, comprising:
   a head phone; and
   a fingerprint reader coupled to the head phone and including a fingerprint sensor and a controller,
      the fingerprint sensor configured to capture a fingerprint of a user; and
      the controller configured to obtain the fingerprint of the user captured by the fingerprint sensor, compare the fingerprint with at least one pre-stored fingerprint, and in response to determining that the fingerprint matches the at least one pre-stored fingerprint, provide a wake-up command to an external electronic device that is communicatively coupled to the headset the wake-up command causing the external electronic device to switch from a sleep mode to a wake-up mode,
      and
      in response to receiving an indication that the external electronic device is in the wake-up mode, facilitate login of an account corresponding to the user on the external electronic device.

9. The headset of claim 8, further comprising:
   a cable for coupling the head phone to the external electronic device; and
   a volume controller mounted on the cable and accommodating the fingerprint reader.

10. The headset of claim 9, wherein the cable includes a connector conforming to a universal serial bus (USB) protocol.

11. The headset of claim 8, wherein the headset is wirelessly coupled to the external electronic device via a wireless communication protocol.

* * * * *